US009458927B2

(12) United States Patent
Yamada et al.

(10) Patent No.: US 9,458,927 B2
(45) Date of Patent: Oct. 4, 2016

(54) HYDRAULIC CONTROL DEVICE FOR AUTOMATIC TRANSMISSION

(71) Applicant: AISIN AW CO., LTD., Anjo-shi, Aichi-ken (JP)

(72) Inventors: Mitsuru Yamada, Nishio (JP); Tozo Yamada, Nagoya (JP); Yoshimitsu Hyodo, Nishio (JP); Kenichi Tsuchida, Nishio (JP); Kazunori Ishikawa, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/438,841

(22) PCT Filed: Dec. 25, 2013

(86) PCT No.: PCT/JP2013/084767
§ 371 (c)(1),
(2) Date: Apr. 27, 2015

(87) PCT Pub. No.: WO2014/104145
PCT Pub. Date: Jul. 3, 2014

(65) Prior Publication Data
US 2015/0260278 A1    Sep. 17, 2015

(30) Foreign Application Priority Data

Dec. 26, 2012 (JP) .................................. 2012-283710

(51) Int. Cl.
*F16H 61/12* (2010.01)
*F16H 61/00* (2006.01)
*F16H 61/686* (2006.01)
*F16H 61/02* (2006.01)

(52) U.S. Cl.
CPC ...... *F16H 61/0021* (2013.01); *F16H 61/0025* (2013.01); *F16H 61/0206* (2013.01); *F16H 61/12* (2013.01); *F16H 61/686* (2013.01); *F16H 2061/0078* (2013.01); *F16H 2061/1224* (2013.01); *F16H 2061/1264* (2013.01)

(58) Field of Classification Search
CPC .................... F16H 2061/1264; F16H 61/12
See application file for complete search history.

(56) References Cited

U.S. PATENT DOCUMENTS

| 4,282,781 A * | 8/1981 | Iwanaga | F16H 61/029 137/86 |
| 4,506,564 A * | 3/1985 | Coutant | F16H 61/0021 477/158 |
| 4,509,389 A * | 4/1985 | Vahratian | F16H 3/66 475/205 |

(Continued)

FOREIGN PATENT DOCUMENTS

JP    H01238750 A    9/1989

OTHER PUBLICATIONS

Mar. 18, 2014 International Search Report issued in International Application No. PCT/JP2013/084767.

*Primary Examiner* — Tisha Lewis
(74) *Attorney, Agent, or Firm* — Oliff PLC

(57) ABSTRACT

A hydraulic control device for an automatic transmission, the hydraulic control device includes: a throttle valve, a primary regulator valve and a failure circuit that includes a first solenoid valve that is switched when the throttle valve is subjected to a failure in which the throttle valve is unable to output the throttle pressure, and that leads a predetermined hydraulic pressure based on switching of the first solenoid valve to the control oil chamber of the primary regulator valve.

10 Claims, 13 Drawing Sheets

(56) References Cited

U.S. PATENT DOCUMENTS

| | | | |
|---|---|---|---|
| 4,919,012 A * | 4/1990 | Bolz | F16H 61/0251 477/131 |
| 5,029,493 A * | 7/1991 | Takada | F16H 59/24 477/156 |
| 5,078,028 A | 1/1992 | Ishikawa et al. | |
| 5,083,481 A * | 1/1992 | Smith | F16H 61/12 477/158 |
| 6,022,293 A * | 2/2000 | Dourra | F16H 61/0021 475/127 |

* cited by examiner

FIG. 4

|   | C-1 | C-2 | C-3 | C-4 | B-1 | B-2 | F-1 |
|---|-----|-----|-----|-----|-----|-----|-----|
| 1ST | ○ |   |   |   |   | (○) | ○ |
| 2ND | ○ |   |   |   | ○ |   |   |
| 3RD | ○ |   | ○ |   |   |   |   |
| 4TH | ○ |   |   | ○ |   |   |   |
| 5TH | ○ | ○ |   |   |   |   |   |
| 6TH |   | ○ |   | ○ |   |   |   |
| 7TH |   | ○ | ○ |   |   |   |   |
| 8TH |   | ○ |   |   | ○ |   |   |
| REV |   |   | ○ |   |   | ○ |   |

※(○): ENGINE BRAKE IN OPERATION

FIG. 6

| GEAR SPEED | SOLENOID | | | | | | |
|---|---|---|---|---|---|---|---|
| | SL1 | SL2 | SL3 | SL4 | SL5 | S1 | S2 |
| 1ST | ○ | | | | | × | × |
| 2ND | ○ | | | | ○ | × | ○ |
| 3RD | ○ | | ○ | | | × | ○ |
| 4TH | ○ | | | ○ | | × | ○ |
| 5TH | ○ | ○ | | | | × | ○ |
| 6TH | | ○ | | ○ | | × | ○ |
| 7TH | | ○ | ○ | | | × | ○ |
| 8TH | | ○ | | | ○ | × | ○ |
| REV | | | ○ | | | × | × |
| ENGINE BRAKE AT 1ST SPEED | ○ | | ○ | | | ○ | × |
| SLT FULL-CLOSURE FAILURE | | | | | | ○ | ○ |

HYDRAULIC CONTROL DEVICE FOR AUTOMATIC TRANSMISSION

BACKGROUND

The present disclosure relates to a hydraulic control device for an automatic transmission to be mounted on an automobile, and in particular to a control device for a line pressure which is a hydraulic pressure for operating friction engagement elements of an automatic transmission.

In the related art, a primary regulator valve regulates a pump pressure from an oil pump to generate a line pressure. In the primary regulator valve, basically, an urging force of a spring and a throttle pressure from a throttle valve act against a feedback pressure of the line pressure acting on a spool, and the line pressure is set by a linear function defined by the minimum proof pressure and the maximum proof pressure (see Japanese Patent Application Publication No. 1-238750).

In general, the minimum pressure of the line pressure is set to be equal to or more than a hydraulic pressure that secures a minimum drive force (evacuation drive force) for ensuring vehicle travel in consideration of a failure.

SUMMARY

In the primary valve, the urging force of the spring is set to be strong so as to secure the evacuation drive force, because the drive force may be insufficient in the case where the throttle valve includes a linear solenoid valve, for example, and the linear solenoid valve is subjected to a full-closure failure and does not output the throttle pressure. Therefore, the minimum pressure of the line pressure defined by the linear function is set to be high, as a result of which the line pressure is also set to be high overall. In fact, the line pressure may be set to be excessively high compared to a hydraulic pressure required for normal travel. Here, as the line pressure becomes higher, the resistance against the engine (i.e. the load on the engine) generated by the oil pump which pumps working oil becomes larger, which hinders improvement in fuel efficiency.

According to the disclosure, there is provided a hydraulic control device for an automatic transmission that addresses the foregoing issue which enables the minimum pressure of a line pressure to be set to be low, and enables a vehicle travel drive force to be secured when a throttle valve is subjected to a failure.

A hydraulic control device according to an exemplary embodiment includes a throttle valve that includes an input port to which a source pressure is input, an output port, and a discharge port, and that outputs a throttle pressure regulated in accordance with torque input to the automatic transmission from the output port; a primary regulator valve that includes a control oil chamber that communicates with the output port of the throttle valve, a pressure regulation port that communicates with a line pressure oil passage that extends from an oil pump, and a feedback pressure port to which a feedback pressure from the line pressure oil passage is supplied, and that regulates a hydraulic pressure at the pressure regulation port to a line pressure with a hydraulic pressure in the control oil chamber and an urging force of a spring acting on one end of a spool and with the feedback pressure from the feedback pressure port acting on the other end of the spool; and a failure circuit that includes a first solenoid valve that is switched when the throttle valve is subjected to a failure in which the throttle valve is unable to output the throttle pressure, and that leads a predetermined hydraulic pressure based on switching of the first solenoid valve to the control oil chamber of the primary regulator valve.

The hydraulic control device according to an exemplary embodiment, wherein: the failure circuit includes a switching valve that includes a communication port that communicates with the control oil chamber of the primary regulator valve and an input port to which the predetermined hydraulic pressure is supplied, and that is switched by switching the first solenoid valve; and when the throttle valve is subjected to a failure in which the throttle valve is unable to output the throttle pressure, the switching valve is switched by switching the first solenoid valve such that the input port and the communication port of the switching valve communicate with each other and the predetermined hydraulic pressure is supplied to the control oil chamber of the primary regulator valve via the input port and the communication port of the switching valve.

The hydraulic control device according to an exemplary embodiment, wherein: the failure circuit includes a switching valve that includes a first port that communicates with the discharge port of the throttle valve, a drain port, and an input port to which the predetermined hydraulic pressure is supplied, and that is switched by the first solenoid valve; and when the throttle valve is subjected to a failure in which the throttle valve is unable to output the throttle pressure, the switching valve is switched by switching the first solenoid valve such that the input port and the first port of the switching valve communicate with each other and the predetermined hydraulic pressure is supplied to the discharge port of the throttle valve via the input port and the first port of the switching valve, and further supplied from the discharge port of the throttle valve to the control oil chamber of the primary regulator valve via the output port.

The hydraulic control device according to an exemplary embodiment, wherein the predetermined hydraulic pressure is an output pressure of the first solenoid valve.

The hydraulic control device according to an exemplary embodiment, wherein the throttle valve includes a line pressure regulation linear solenoid valve that uses a modulator pressure as a source pressure, and the predetermined hydraulic pressure is the modulator pressure which is the source pressure for the line pressure regulation linear solenoid valve.

The hydraulic control device according to an exemplary embodiment, wherein the failure circuit includes an oil passage that leads the predetermined hydraulic pressure to the control oil chamber of the primary regulator valve via a check valve.

The hydraulic control device according to an exemplary embodiment, further including a second solenoid valve; and a supply/discharge switching valve that switches between supply and discharge of a control pressure from a predetermined linear solenoid valve to and from a hydraulic servo for an engine brake friction engagement element that is engaged to apply engine brake at a first forward speed using an output pressure from the second solenoid valve, wherein the predetermined hydraulic pressure is the output pressure from the second solenoid valve.

The hydraulic control device according to an exemplary embodiment, wherein: the supply/discharge switching valve is switched by the output pressure from the second solenoid valve to a blocked state in which supply of the control pressure to the hydraulic servo for the engine brake friction engagement element is blocked during forward travel at a higher shift speed with a gear ratio that is lower than that of the first forward speed; and the supply/discharge switching valve is switched to a supply state in which the control pressure can be supplied to the hydraulic servo for the engine brake friction engagement element during travel at the first forward speed or a reverse speed.

The hydraulic control device according to an exemplary embodiment, wherein: the supply/discharge switching valve includes a distribution valve that selectively supplies the control pressure for the predetermined linear solenoid valve to one of a hydraulic servo for a first friction engagement element that is engaged to establish a predetermined forward speed and the hydraulic servo for the engine brake friction engagement element; and the switching valve is integrally used also as the distribution valve.

The hydraulic control device according to an exemplary embodiment, further including: an electronic control unit that detects a failure of the throttle valve in which the input port and the output port are fully closed, wherein the first solenoid valve is switched to output an output pressure when the electronic control unit detects a failure.

According to an exemplary embodiment, in the case where the throttle valve is subjected to a full-closure failure, the first solenoid valve is switched so that the predetermined hydraulic pressure is supplied from the failure circuit to the control oil chamber of the primary regulator valve. Thus, a hydraulic pressure that is equal to or more than a drive force that can drive the vehicle can be secured as the line pressure. In addition, the minimum pressure of the line pressure can be set to an appropriate value without considering a full-closure failure of the throttle valve. Thus, a pressure loss (a resistance caused by an oil pump, i.e. a load on the engine) can be reduced to improve the fuel efficiency.

According to an exemplary embodiment, the switching valve is switched by the first solenoid valve so that the predetermined hydraulic pressure is supplied to the control oil chamber of the primary regulator valve.

According to an exemplary embodiment, the predetermined hydraulic pressure from the switching valve is supplied from the discharge port of the throttle valve to the control oil chamber of the primary regulator valve via the output port. Thus, an oil passage for supplying the throttle pressure to the primary regulator valve can be used also for another purpose, which eliminates the need for a check valve or the like to suppress the cost and also simplifies the oil passage structure.

According to an exemplary embodiment, the output pressure of the first solenoid valve which operates when the throttle valve is subjected to a full-closure failure is used as the predetermined hydraulic pressure to be supplied to the primary regulator valve. Thus, the predetermined hydraulic pressure can be supplied to the switching valve or the like only when necessary to suppress a waste of oil.

According to an exemplary embodiment, the predetermined hydraulic pressure supplied when the throttle valve is subjected to a full-closure failure is a modulator pressure that is the same as the source pressure for the throttle valve which includes a linear solenoid valve. Thus, the predetermined hydraulic pressure can be regulated to a line pressure that is the same as that when the throttle valve is fully open, which can secure a line pressure that ensures a drive force that enables travel under any circumstances. In addition, the source pressure which is the same as that during normal times is supplied to the input port of the line pressure regulation linear solenoid valve. Therefore, the durability of the line pressure regulation linear solenoid valve is less affected than in the case where a pressure that is higher than that during normal times is supplied to the input port (e.g. a case where the line pressure is supplied to the input port when the throttle valve is subjected to a full-closure failure) or the like.

According to an exemplary embodiment, it is possible to prevent the throttle pressure led from the output port of the throttle valve to the control oil chamber of the primary regulator valve from flowing to other valves.

According to an exemplary embodiment, the output pressure from the second solenoid valve is used as the predetermined hydraulic pressure. Therefore, the second solenoid valve for switching the supply/discharge switching valve can be used in a shared manner in a hydraulic circuit for securing the line pressure which ensures a drive force when the throttle valve is subjected to a full-closure failure. Thus, there is no need to add a dedicated solenoid valve, and it is possible to suppress an increase in number of components of the hydraulic control device.

According to an exemplary embodiment, the switching valve is integrally used also as the distribution valve which distributes the control pressure for the predetermined linear solenoid valve to the hydraulic servo for a predetermined forward speed and the hydraulic servo for engine brake at the first speed. Thus, it is possible to prevent the configuration of the hydraulic control device from being complicated.

According to an exemplary embodiment, a full-closure failure of the throttle valve is detected by the electronic control unit.

BRIEF DESCRIPTION OF THE DRAWINGS

FIG. 4 is an engagement table of the automatic transmission of FIG. 3.

FIG. 6 illustrates operation of each solenoid valve according to the embodiment of the present disclosure.

DETAILED DESCRIPTION OF THE EMBODIMENTS

Figure 1:
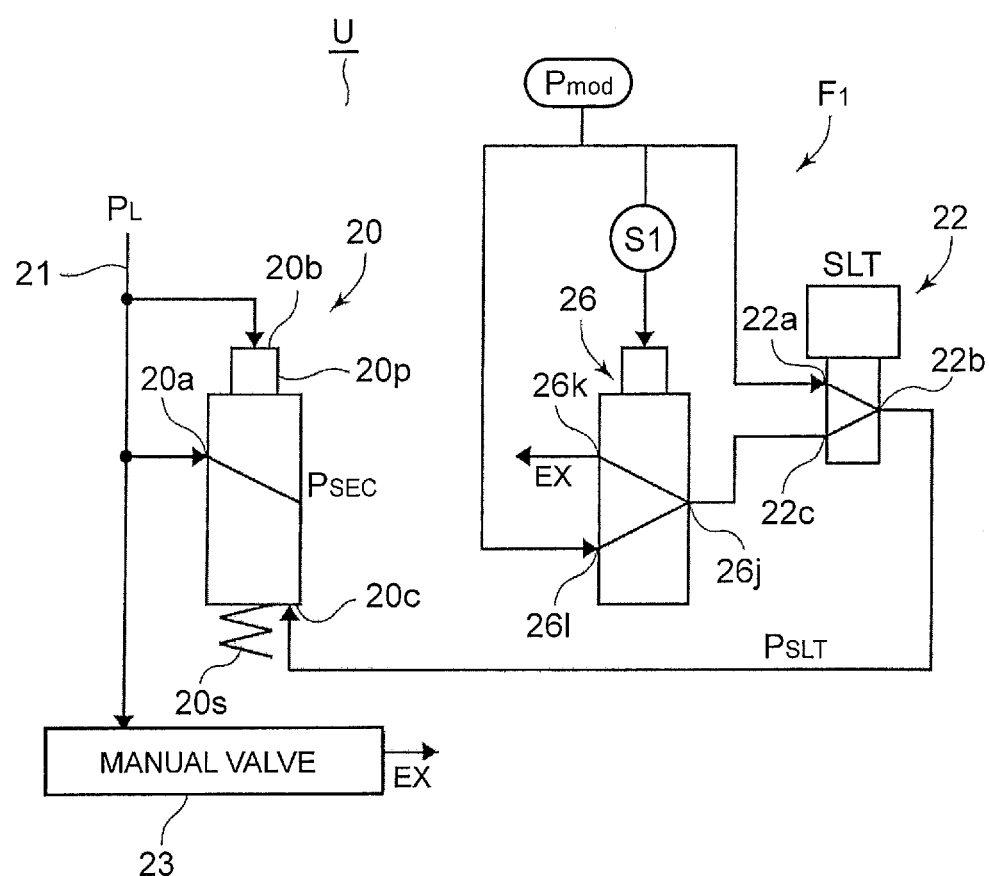
FIG. 1 is a schematic diagram illustrating a basic configuration of a hydraulic control device (failure circuit) according to the present disclosure.

First, the basic configuration of a hydraulic control device U having a failure circuit $F_1$ according to the present disclosure will be described with reference to FIGS. 1 and 2. In a primary regulator valve 20, as illustrated in FIG. 1, a hydraulic pressure from an oil pump is supplied to a line pressure regulation port 20a to be regulated to a line pressure $P_L$, and a hydraulic pressure from a line pressure oil passage 21 acts on a spool as a feedback pressure. A hydraulic pressure at the pressure regulation port 20a is regulated to the line pressure $P_L$ while being drained by a feedback pressure that acts on one end of the spool from a feedback pressure port 20b and the urging force of a spring 20s and a throttle pressure $P_{SLT}$ from a throttle valve 22 which act on the other end of the spool from a control oil chamber 20c. The drained hydraulic pressure is discharged as a secondary pressure $P_{sec}$. The line pressure $P_L$ is supplied to a hydraulic servo for each friction engagement element via the line pressure oil passage 21, a manual valve 23, and so forth.

The throttle valve 22 includes a line pressure regulation linear solenoid valve (SLT), and controls the throttle pressure $P_{SLT}$ by controlling the proportion of communication of an output port 22b and a discharge port 22c with an input port 22a in accordance with an accelerator operation by a driver during normal times. Thus, a modulator pressure $P_{mod}$ from the input port 22a is output from the output port 22b as the throttle pressure $P_{SLT}$, and a part of the modulator pressure $P_{mod}$ is discharged from the discharge port 22c. The throttle pressure $P_{SLT}$ from the output port 22b is supplied to the control oil chamber 20c of the primary regulator valve 20 to regulate and control the line pressure $P_L$. Oil discharged from the discharge port 22c is drained via a switching valve 26. That is, the throttle pressure $P_{SLT}$ is regulated in accordance with torque input to an automatic transmission. The torque input to the automatic transmission is estimated from engine output torque estimated from the operating state of an engine, an engine output torque signal received from an engine ECU, and the throttle opening.

During normal times, the switching valve 26 is in a first state in which a first port 26j communicates with a drain port 26k with a first solenoid valve S1 turned off. In the case where the throttle valve 22 is subjected to a full-closure failure, however, the switching valve 26 is switched to a second state in which the first port 26j communicates with an input port 26l by turning on the solenoid valve S1. Consequently, the modulator pressure $P_{mod}$ is supplied to the discharge port 22c of the throttle valve 22 via the ports 26l and 26j. Preferably, a second solenoid valve S2 is turned on as discussed later so that the modulator pressure $P_{mod}$ from the solenoid valve S2 is supplied to the port 26l. A predetermined hydraulic pressure supplied to the input port 26l of the switching valve 26 is not limited to the modulator pressure $P_{mod}$, and may be equal to or more than a hydraulic pressure (minimum evacuation pressure) that allows securing a minimum drive force for vehicle travel.

In this state, the throttle valve 22 is brought into a fully closed state in which the throttle valve 22 is unable to output the throttle pressure, that is, a state in which the input port 22a and the output port 22b are fully closed and the output port 22b and the discharge port 22c communicate with each other. Thus, the modulator pressure $P_{mod}$ from the first port 26j of the switching valve 26 is led from the discharge port 22c to the output port 22b. The modulator pressure acts on the control oil chamber 20c at the lower end of the spool of the primary regulator valve 20.

Figure 2A:
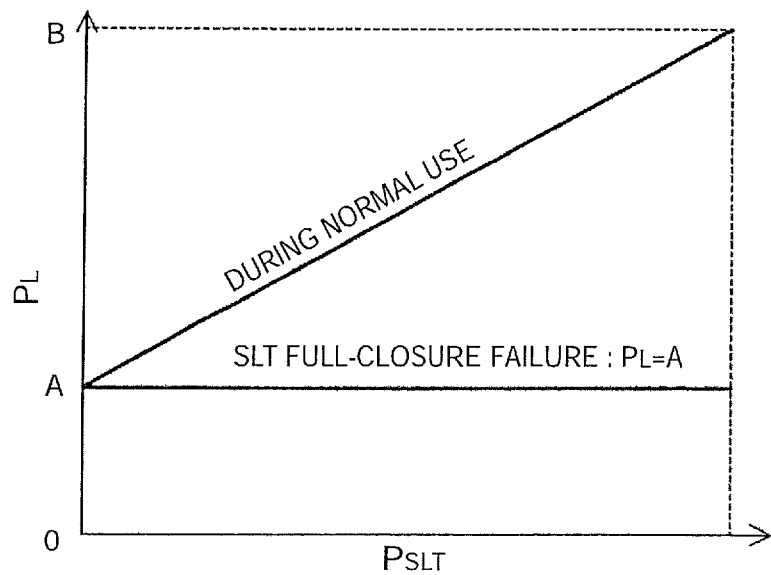
FIG. 2 illustrates the characteristics of a primary regulator valve, in which FIG. 2A corresponds to the related art and FIG. 2B corresponds to the present disclosure.

Thus, in the related art, as illustrated in FIG. 2A, a minimum proof pressure A of the line pressure $P_L$ is set to a hydraulic pressure A that secures a minimum evacuation drive force in preparation for a case where the throttle valve (linear solenoid valve SLT) is subjected to a full-closure failure, and the line pressure $P_L$ is set in proportion to the throttle pressure $P_{SLT}$ from the throttle valve with reference to the minimum proof pressure A until a maximum proof pressure B is reached. In the present disclosure, in the case where the throttle valve (SLT) 22 is subjected to a full-closure failure, as discussed above, the modulator pressure from the discharge port 22c of the throttle valve 22 acts on the primary regulator valve 20 so that the line pressure is regulated to the same value as that when the throttle valve 22 is fully open ($P_L$=B). This secures a drive force in any travel state.

Figure 2B:
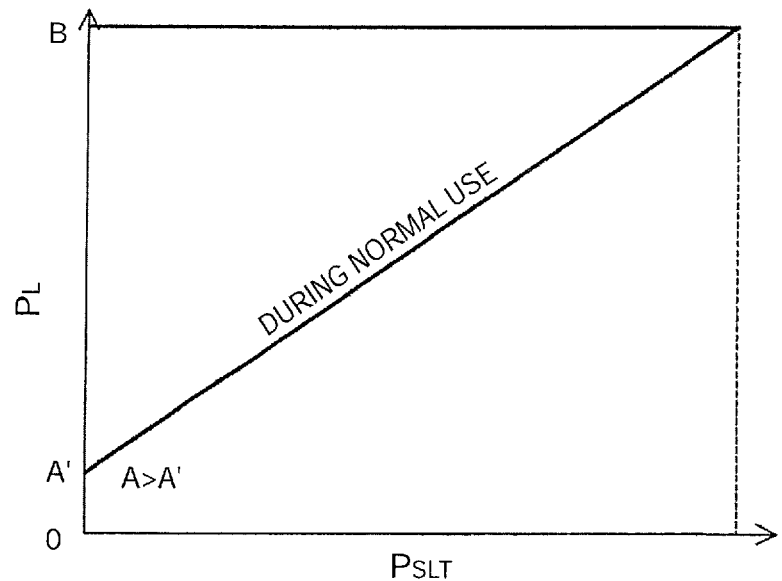

Consequently, as illustrated in FIG. 2B, the primary regulator valve 20 according to the present disclosure is not restrained by the minimum evacuation drive force (A), and the urging force of the spring 20s can be set to be small so that a minimum pressure A' based on the spring can be set to be lower than the minimum proof pressure A in the primary regulator valve according to the related art (A>A'). Thus, the line pressure $P_L$ during normal use is defined by a linear function that connects between the minimum pressure A' and the maximum pressure B, and the line pressure $P_L$ can be set to be low compared to that according to the related art.

An embodiment of the present disclosure will be described below with reference to the drawings. An automatic transmission according to the present disclosure is an automatic transmission that is suitably mounted on FF (front-engine front-drive) vehicles. The left-right direction in FIG. 3 corresponds to the left-right direction with the automatic transmission actually mounted on a vehicle. For convenience of description, however, the right side of the drawing on which a drive source such as an engine is provided is referred to as "front side", and the left side of the drawing is referred to as "rear side".

Figure 3:
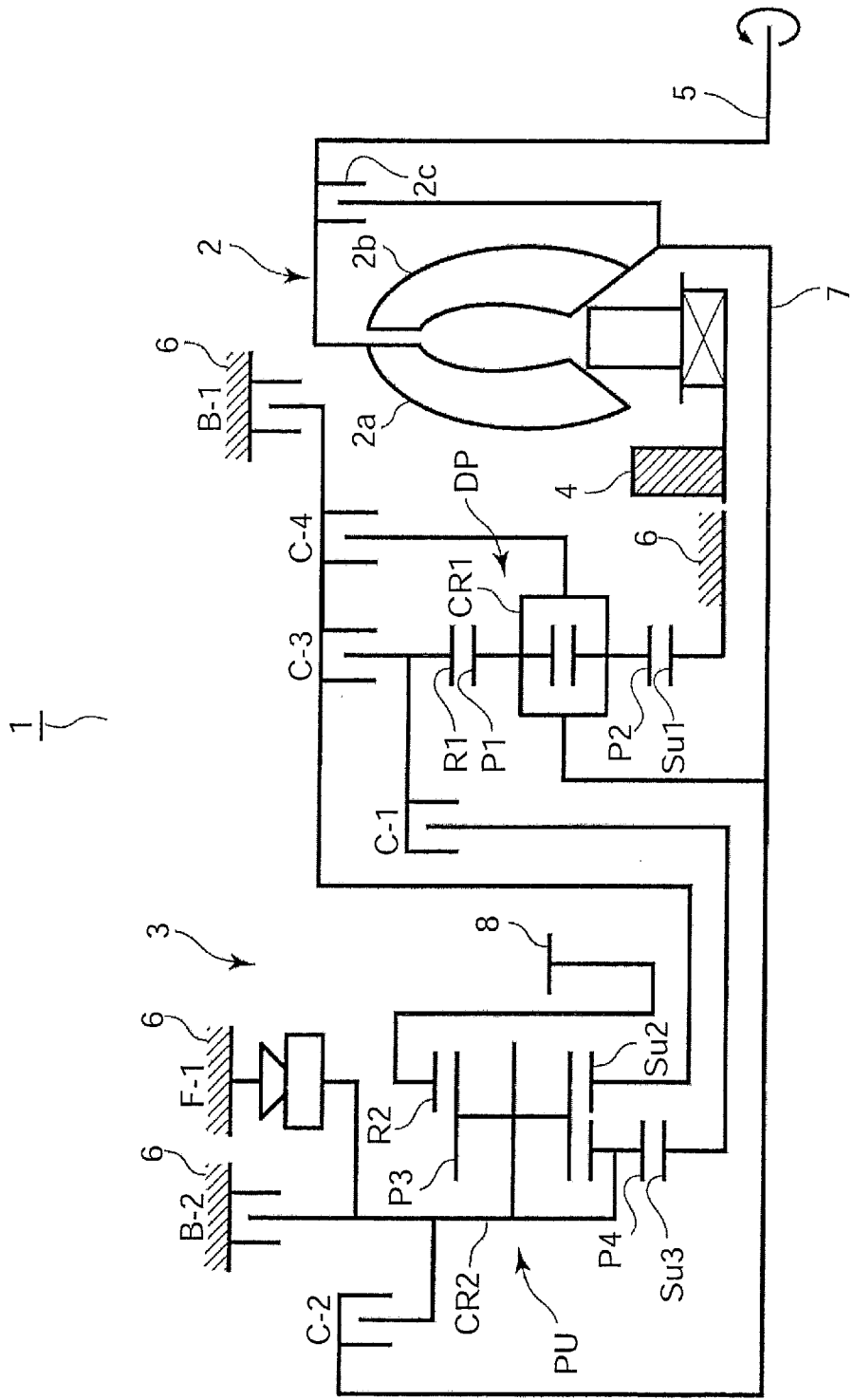
FIG. 3 is a skeleton diagram of an automatic transmission according to an embodiment of the present disclosure.

A schematic configuration of an automatic transmission 1 to which the present disclosure may be applied will be described with reference to FIG. 3. The automatic transmission 1, which is suitable for use in FF vehicles, for example, includes an input shaft 5 that may be connected to an engine, and a torque converter 2 and an automatic speed change mechanism 3 provided in a manner parallel to the input shaft 5 in the axial direction.

The torque converter 2 includes a pump impeller 2a connected to the input shaft 5 of the automatic transmission 1, and a turbine runner 2b to which rotation of the pump impeller 2a is transferred via a working fluid. The turbine runner 2b is connected to an input shaft 7 of the automatic speed change mechanism 3. The torque converter 2 also includes a lock-up clutch 2c. When the lock-up clutch 2c is engaged, rotation of the input shaft 5 of the automatic transmission 1 is directly transferred to the input shaft 7 of the automatic speed change mechanism 3.

The automatic speed change mechanism 3 includes, on the input shaft 7, a planetary gear (speed-reducing planetary gear) DP and a planetary gear unit PU provided on a downstream side of transmission from the planetary gear DP. The planetary gear DP is a so-called double-pinion planetary gear, which includes a first sun gear Su1, a first carrier CR1, and a first ring gear R1 and in which the first carrier CR1 has pinions P2 meshed with the first sun gear Su1 and pinions P1 meshed with the first ring gear R1 in such a manner that the pinions P2 and the pinions P1 are meshed with each other.

Meanwhile, the planetary gear unit PU is a so-called Ravigneaux type planetary gear, which includes four rotary elements, namely a second sun gear Su2, a third sun gear Su3, a second carrier CR2, and a second ring gear R2 and in which the second carrier CR2 has long pinion gears P3 meshed with the second sun gear Su2 and the second ring gear R2 and short pinion gears P4 meshed with the third sun gear Su3 in such a manner that the long pinion gears P3 and the short pinion gears P4 are meshed with each other.

The first sun gear Su1 of the planetary gear DP is stationary in terms of rotation with respect to a transmission case 6. In addition, the first carrier CR1 is connected to the input shaft 7 so as to make the same rotation (hereinafter referred to as "input rotation") as rotation of the input shaft 7, and connected to a fourth clutch C-4. Further, the first ring gear R1 makes reduced-speed rotation that is reduced in speed compared to the input rotation through the first sun gear Su1 which is stationary and the first carrier CR1 which makes the input rotation, and is connected to a first clutch C-1 and a third clutch (second friction engagement element) C-3.

The second sun gear Su2 of the planetary gear unit PU is connected to a first brake B-1 to be selectively stationary with respect to the transmission case 6. In addition, the second sun gear Su2 is connected to the fourth clutch C-4 and the third clutch C-3 so as to selectively receive the input rotation of the first carrier CR1 via the fourth clutch C-4 and the reduced-speed rotation of the first ring gear R1 via the third clutch C-3. Further, the third sun gear Su3 is connected to the first clutch C-1 so as to selectively receive the reduced-speed rotation of the first ring gear R1.

In addition, the second carrier CR2 is connected to a second clutch C-2 to which rotation of the input shaft 7 is input so as to selectively receive the input rotation via the second clutch C-2, and connected to a one-way clutch F-1 and a second brake (first friction engagement element) B-2. Therefore, the second carrier CR2 is restricted from rotating in one direction with respect to the transmission case 6 via the one-way clutch F-1, and selectively stationary in terms of rotation with respect to the transmission case 6 via the second brake B-2. In addition, the second ring gear R2 is connected to a counter gear 8. The counter gear 8 is connected to drive wheels via a counter shaft and a differential device (not illustrated).

In the automatic transmission 1 discussed above, the clutches and the brakes are operated in combinations indicated in the operation table of FIG. 4 to establish each of first to eighth forward speeds and a first reverse speed. Although not indicated in the operation table, the automatic transmission 1 can also establish a second reverse speed by engaging the fourth clutch C-4 and engaging the second brake B-2.

Figure 5:
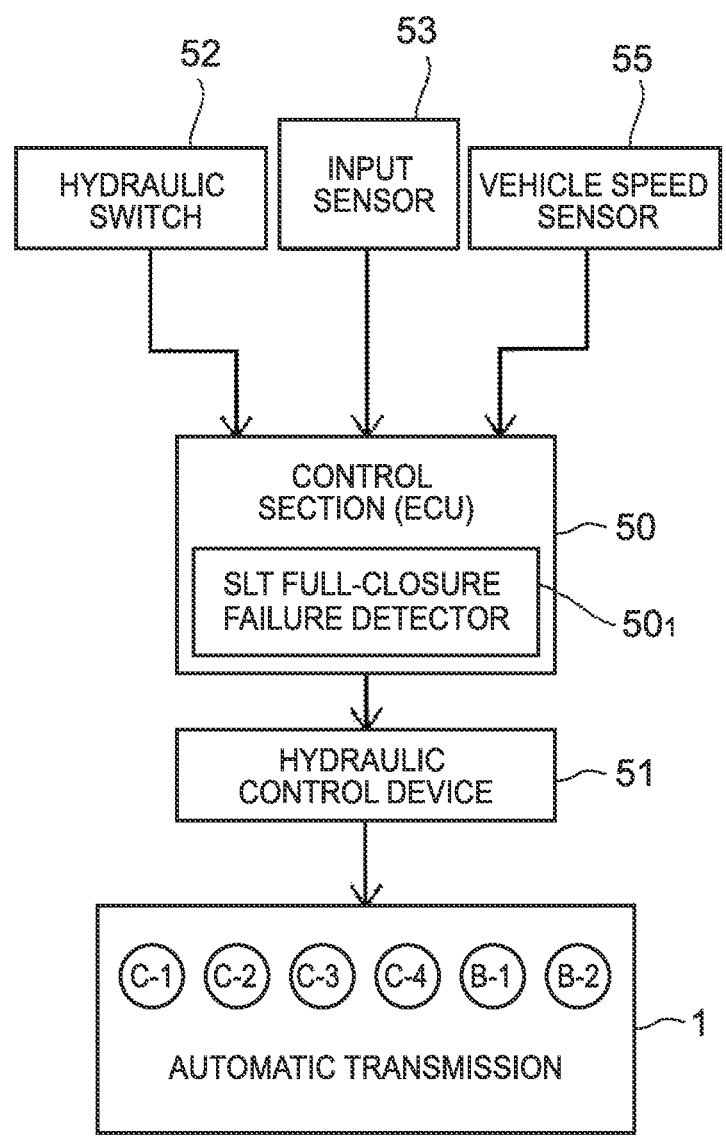
FIG. 5 is a schematic block diagram illustrating a control section, the hydraulic control device, and the automatic transmission.

As illustrated in FIG. 5, the clutches C-1, C-2, C-3, and C-4 and the brakes B-1 and B-2 of the automatic transmission 1 are controlled by a multiplicity of valves of a hydraulic control device 51. The hydraulic control device 51 includes a multiplicity of linear solenoid valves SL1, SL2, SL3, SL4, and SL5, a throttle valve SLT, and on/off solenoid valves S1 and S2 (see FIG. 6). The linear solenoid valves are controlled in accordance with a hydraulic control signal from a control section (ECU) 50. The control section 50 receives various signals input from a hydraulic pressure sensor 52, an input rotation sensor 53, an output rotation sensor 55, and so forth, and includes a SLT full-closure failure detector $50_1$ for determining a failure in which the input port 22a and the output port 22b of the throttle valve 22 are fully closed, besides determining shifting.

Figure 10:
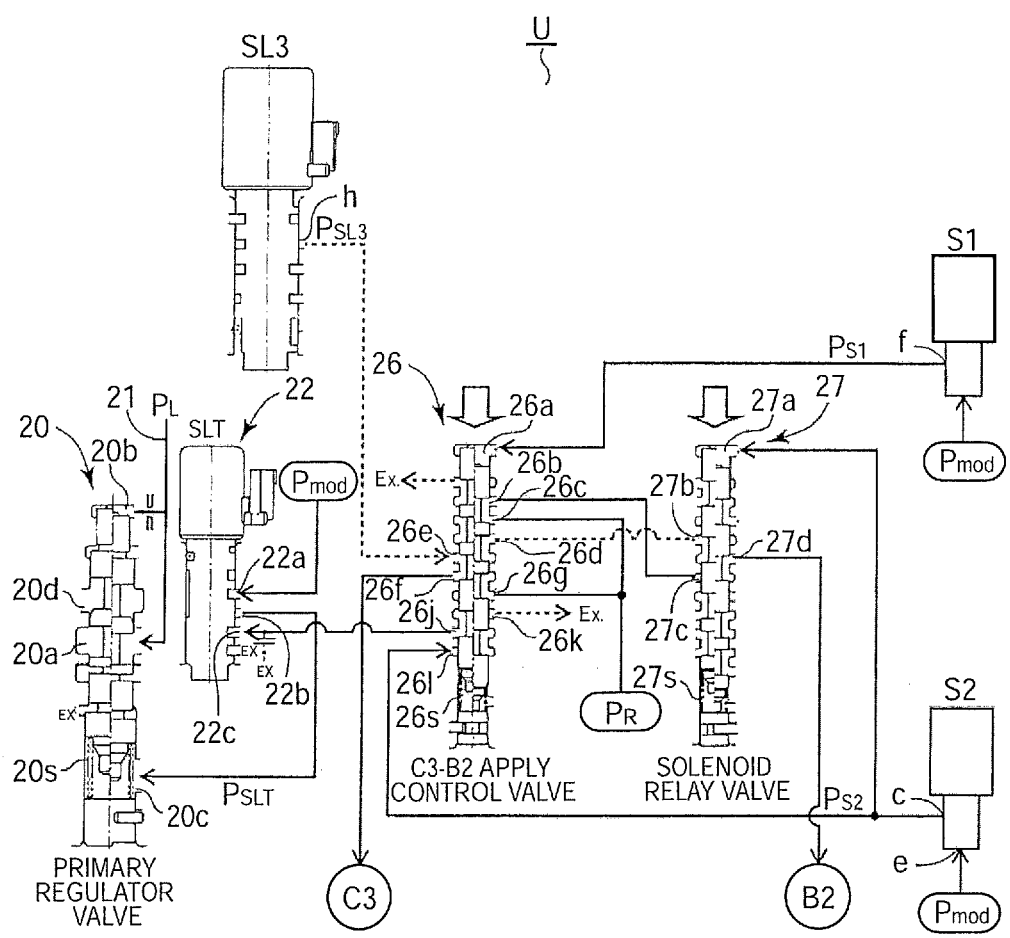
FIG. 10 illustrates an essential portion of the hydraulic control device according to the embodiment of the present disclosure, illustrating a state in which a throttle valve is subjected to a full-closure failure.

The SLT full-closure failure detection detector $50_1$ determines a full-closure failure (i.e. a failure in which the throttle valve is unable to output a throttle pressure) by detecting the throttle pressure $P_{SLT}$ using the hydraulic pressure sensor 52 which is provided in a throttle pressure ($P_{SLT}$) oil passage 37 illustrated in FIGS. 10 and 13 to be discussed later. For example, a full-closure failure of the throttle valve is determined when the hydraulic pressure sensor 52 does not detect a hydraulic pressure in the case where a hydraulic control signal is output to output a throttle pressure. Alternatively, the failure may be determined as follows. The current shift speed and the gear ratio matching the shift speed are acquired. The actual gear ratio is calculated using the input rotation sensor 53 and the output rotation sensor 55. The actual gear ratio and the gear ratio of the shift speed are compared. In the case where the difference between the gear ratios is equal to or more than a predetermined range, it is determined that a predetermined shift speed is not established with the friction engagement elements (clutches and brakes) slipping. In situations where other abnormalities such as a solenoid abnormality are not detected in the above determination, it is determined that the line pressure is not raised to a normal value, and it is detected that the throttle valve 22 is subjected to a full-closure failure.

Now, a hydraulic control device for the automatic transmission will be described with reference to FIGS. 6 to 10. In the hydraulic control device, although not described in detail, basically, the linear solenoid valves SL1, SL2, SL3, SL4, and SL5 correspond to the clutches C-1, C-2, C-3, and C-4 and the brake B-1, respectively, as illustrated in FIG. 5, and operate as illustrated in FIG. 6. A linear solenoid for the second brake B-2 for engine brake is not illustrated. Instead, as illustrated in FIGS. 7 to 10, a C3-B2 apply control valve 26 and a solenoid relay valve 27 operated by the first and second solenoid valves S1 and S2 are disposed.

Figure 7:
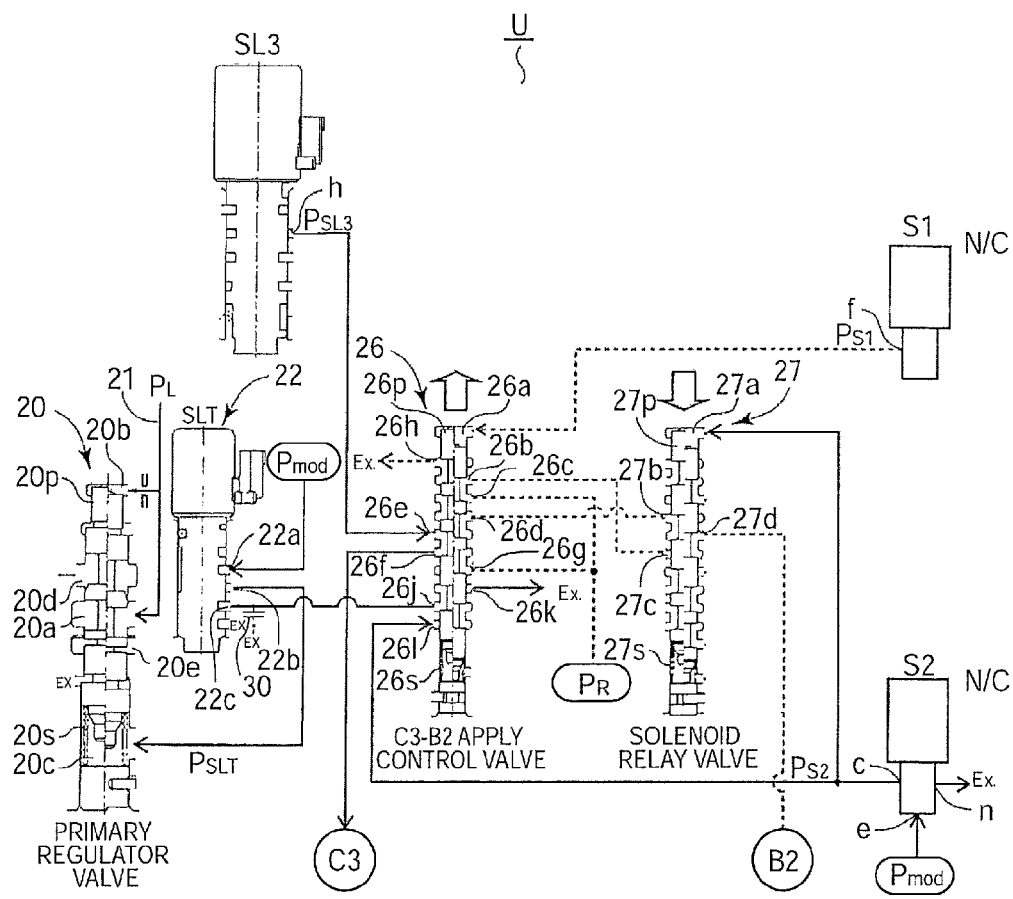
FIG. 7 illustrates an essential portion of the hydraulic control device according to the embodiment of the present disclosure, illustrating a state in which a forward shift speed (e.g. a third speed) with engagement of a C3 clutch is established during normal times.

As illustrated in FIG. 7, the C3-B2 apply control valve 26 functions as a distribution valve during normal times, and includes a spool 26p, a spring 26s that urges the spool 26p upward in the drawing, and a working oil chamber 26a provided above the spool 26p in the drawing. The C3-B2 apply control valve 26 also includes: first and second input ports 26c and 26g serving as reverse range pressure input ports which are connected to a reverse range pressure output port of the manual valve and to which a reverse range pressure $P_R$ is input; an input port 26e serving as a control pressure input port to which a control hydraulic pressure $P_{SL3}$ from the linear solenoid valve SL3 is input; an output port (first output port) 26b; an output port (second output port) 26d; an output port (third output port) 26f; and a drain port 26h. Furthermore, the C3-B2 apply control valve 26 is also provided with a function as a throttle pressure switching valve discussed earlier, and includes the first port 26j which communicates with the discharge port 22c of the throttle valve (SLT) 22, the drain port 26k, and the input port 26l which communicates with an output port c of the second solenoid valve S2.

In the C3-B2 apply control valve 26, in addition, the working oil chamber 26a is connected to an output port f of the first on/off solenoid valve S1 of a normally closed type that makes no output when not energized (a solenoid valve that, when energized, outputs the modulator pressure $P_{mod}$ generally as it is as an output pressure $P_{S1}$ that may switch the valve 26). Therefore, when the output pressure (first switching pressure) $P_{S1}$ is output from the first on/off solenoid valve S1 to the working oil chamber 26a, the C3-B2 apply control valve 26 is switched from a first state (left-half position) to a second state (right-half position).

When the C3-B2 apply control valve 26 is in the first state (left-half position), the first output port 26b and the drain port 26h communicate with each other, the reverse range pressure first input port 26c and the first output port 26d communicate with each other, the control pressure input port 26e and the third output port 26f communicate with each other, and the first port 26j and the drain port 26k communicate with each other. When the C3-B2 apply control valve 26 is in the second state (right-half position), the reverse range pressure first input port 26c and the first output port 26b communicate with each other, the input port 26e and the second output port 26d communicate with each other, the reverse range pressure second input port 26g and the third output port 26f communicate with each other, and the first port 26j and the input port 26l communicate with each other.

The solenoid relay valve (supply/discharge switching valve) 27 includes a spool 27p, a spring 27s that urges the spool 27p upward in the drawing, and a working oil chamber 27a provided above the spool 27p in the drawing. The solenoid relay valve (supply/discharge switching valve) 27 further includes an input port (first input port) 27b, an input port (second input port) 27c, and an output port 27d connected to a hydraulic servo for the second brake B-2.

When an output pressure $P_{S2}$ from the second on/off solenoid valve S2 of a normally closed type that makes no output when not energized (i.e. a solenoid valve that, when energized, outputs the modulator pressure $P_{mod}$ generally as it is as an output pressure $P_{S2}$ that may switch the valve 27) is output to the working oil chamber 27a, the solenoid relay valve (supply/discharge switching valve) 27 is switched from the left-half position to the right-half position.

When the solenoid relay valve (supply/discharge switching valve) 27 is at the left-half position, the first input port 27b and the output port 27d communicate with each other. When the solenoid relay valve (supply/discharge switching valve) 27 is at the right-half position, the second input port 27c and the output port 27d communicate with each other.

The throttle valve (SLT) 22 which includes a linear solenoid valve includes the input port 22a to which the modulator pressure $P_{mod}$ is input, the output port 22b to which the throttle pressure $P_{SLT}$ which has been regulated and controlled in accordance with the throttle opening is output, and the discharge port 22c. The output port 22b communicates with the control oil chamber 20c of the primary regulator valve 20. Meanwhile, the discharge port 22c communicates with the first port 26j of the C3-B2 apply control valve 26. Similarly, the third linear solenoid valve SL3 regulates and controls the modulator pressure such that the control hydraulic pressure $P_{SL3}$ is output from an output port h. The output port h communicates with the input port 26e of the C3-B2 apply control valve 26.

The primary regulator valve 20 includes a spool 20p and a spring 20s disposed in the control oil chamber 20c to urge the spool 20p in one direction together with the throttle pressure $P_{SLT}$. Further, the line pressure oil passage 21 which communicates with the discharge side of the oil pump communicates with the pressure regulation port 20a, and communicates with the feedback pressure port 20b so as to urge the spool 20p in the other direction as a feedback pressure. In addition, the primary regulator valve 20 includes a return port 20d that communicates with the input side of the oil pump, and a port 20e supplied to a secondary regulator valve. A part of the line pressure is supplied to a modulator valve to be regulated to the modulator pressure $P_{mod}$ which is a generally constant pressure.

The function of the hydraulic control device U will be described. During forward travel in a D range, as illustrated in FIG. 6, the first solenoid valve S1 is turned off (not energized) and the second solenoid valve S2 is turned on (energized) with any of the first to eighth speeds established. During application of engine brake with the first speed established, the second solenoid valve S2 is turned off. Therefore, in the D range, operation of the solenoid relay valve 27 makes no difference. Thus, the second solenoid valve S2 may be turned off even in the D range with the first speed established in preparation for engine brake. In this state, as illustrated in FIG. 7, the C3-B2 apply control valve 26 is brought into the first state (left-half position) by the spring 26s with a hydraulic pressure (first switching pressure) not supplied to the working oil chamber 26a, and the solenoid relay valve 27 is in the right-half position with an output pressure (second switching pressure) supplied to the working oil chamber 27a.

The throttle valve 22 is operating normally, and regulates a modulator pressure $P_{mod}$ to output a throttle pressure $P_{SLT}$ matching the throttle opening from the output port 22b. The throttle pressure $P_{SLT}$ acts on the control oil chamber 20c of the primary regulator valve 20 to output a line pressure $P_L$ that is proportional to the throttle pressure $P_{SLT}$ as illustrated in FIG. 2B. In this event, a spring with low elasticity is used as the spring 20s, and the minimum pressure A' is set to be low compared to that according to the related art (see A in FIG. 2A). Thus, the line pressure $P_L$ during normal use (A' to B; the maximum pressure B is the same as that according to the related art) is set to be low overall, which accordingly reduces a hydraulic pressure loss to reduce fuel consumption. Oil discharged from the discharge port 22c of the throttle valve 22 is discharged through the first port 26j and the drain port 26k of the C3-B2 apply control valve (switching valve) 26. In addition, the second solenoid valve S2 has been turned on, and outputs the modulator pressure $P_{mod}$ from the output port c. However, the modulator pressure $P_{mod}$ is blocked by the port 26l of the C3-B2 apply control valve 26, and does not affect the throttle valve 22.

In this state, with the third or seventh speed established, the control hydraulic pressure $P_{SL3}$ output from the third linear solenoid valve SL3 is supplied to a hydraulic servo C3 for the third clutch C-3 through the input port 26e and the third output port 26f of the C3-B2 apply control valve 26 which functions as a distribution valve. Thus, the clutches C-1 to C-4 and the brake B-1 are controlled as illustrated in FIG. 4 by controlling the linear solenoid valves SL1 to SL5 illustrated in FIG. 6 in accordance with the shift speed on the basis of a signal from the control section. As a result, each shift speed is established.

Figure 8:
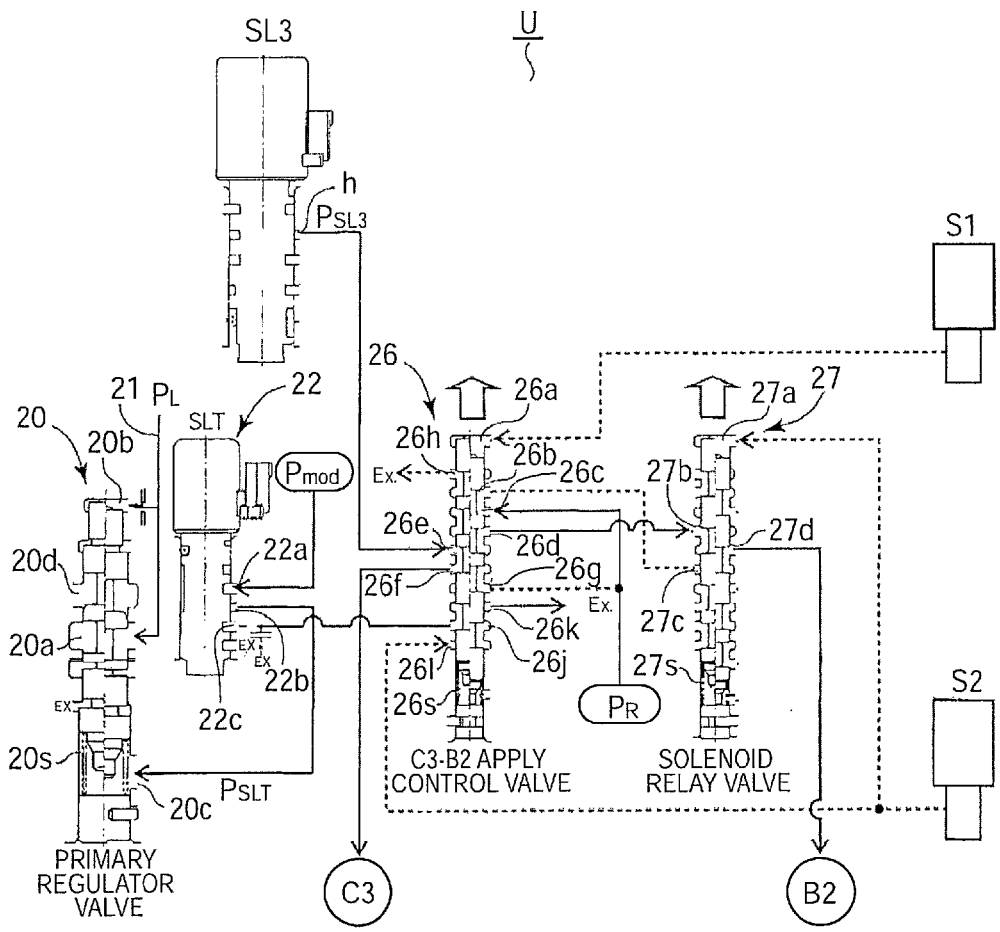
FIG. 8 illustrates an essential portion of the hydraulic control device according to the embodiment of the present disclosure, illustrating a reverse state during normal times.

During normal reverse travel in which the driver operates a shift lever into a reverse range, the first and second solenoid valves S1 and S2 are both turned off (not energized). In this state, as illustrated in FIG. 8, the C3-B2 apply control valve 26 is in the first state (left-half position), and the solenoid relay valve 27 is brought into the left-half position by the spring 27s. The line pressure is controlled in accordance with the throttle pressure $P_{SLT}$ from the throttle valve 22 in the same manner, and the control hydraulic pressure $P_{SL3}$ from the third linear solenoid valve SL3 is supplied to the hydraulic servo C3 for the third clutch C-3 via the ports 26e and 26f of the C3-B2 apply control valve 26. In addition, the reverse range pressure $P_R$ from the manual valve is supplied to a hydraulic servo B2 for the second brake B-2 via the first input port 26c and the second output port 26d of the C3-B2 apply control valve 26 and further the first input port 27b and the output port 27d of the solenoid relay valve 27. Consequently, a reverse speed is established with the third clutch C-3 and the second brake B-2 engaged.

Meanwhile, in the case where the operation of the shift lever into the reverse range by the driver is performed when the vehicle is traveling forward at a speed that is equal to or more than a reverse permission speed, the second solenoid valve S2 is held on. In this state, the solenoid relay valve 27 is at the right-half position, and the reverse range pressure supplied via the ports 26c and 26d of the C3-B2 apply control valve 26 is blocked by the port 27b of the relay valve 27, and the hydraulic servo B2 for the second brake is drained via the ports 27d and 27c of the relay valve 27 and the ports 26b and 26h of the C3-B2 apply control valve 26. Consequently, establishment of a reverse speed is inhibited (reverse inhibit) until the vehicle speed becomes equal to or less than the reverse permission speed.

Figure 9:
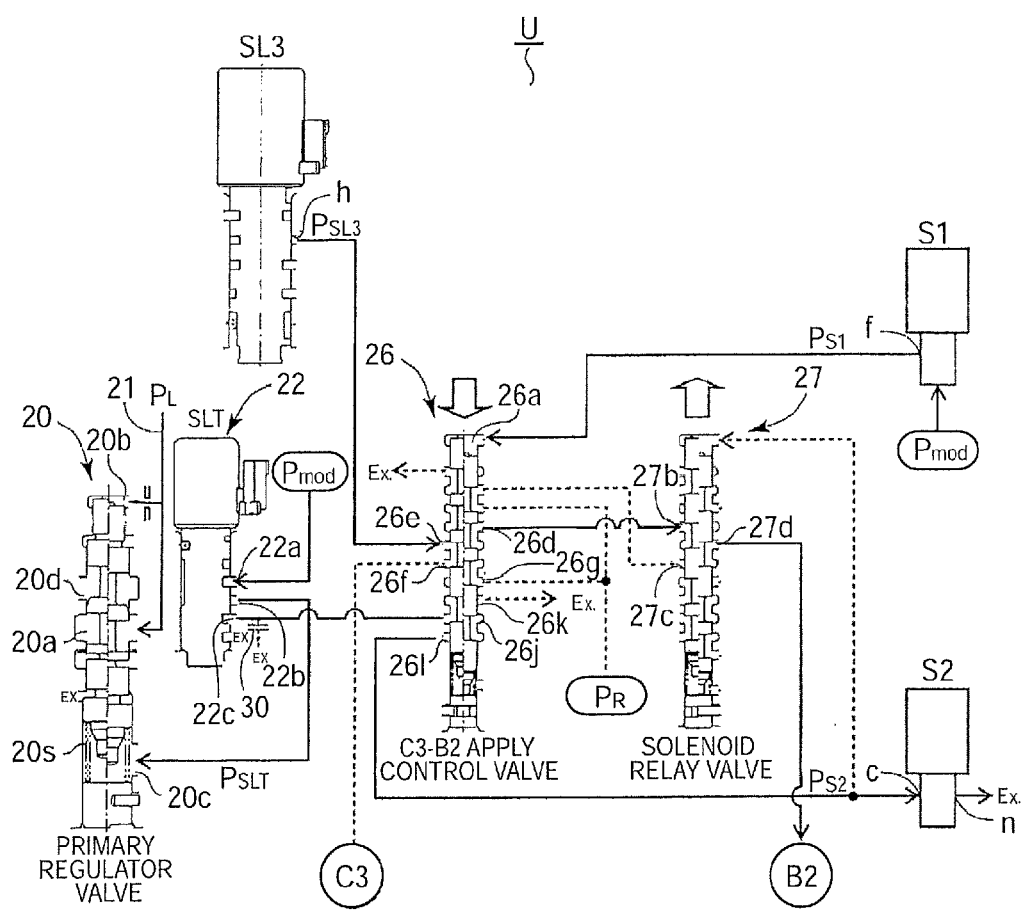
FIG. 9 illustrates an essential portion of the hydraulic control device according to the embodiment of the present disclosure, illustrating a state in which engine brake is applied at a first speed.

In the case where the driver operates the shift lever into the first forward speed to apply engine brake, the first solenoid valve S1 is turned on (energized), and the second solenoid valve S2 is turned off (not energized). In this state, as illustrated in FIG. 9, the C3-B2 apply control valve 26 which functions as a distribution valve is in the second state (right-half position) with the $P_{SL}$ pressure (modulator pressure) supplied to the working oil chamber 26a, and the solenoid relay valve 27 is at the left-half position.

Thus, the control hydraulic pressure $P_{SL3}$ from the third linear solenoid valve SL3 is supplied to the hydraulic servo B2 for the second brake B-2 via the input port 26e and the second output port 26d of the C3-B2 apply control valve 26 and the first input port 27b and the output port 27d of the relay valve 27. Consequently, the second brake B-2 is controlled so as to be engaged by the third linear solenoid valve SL3, which is combined with engagement control for the first clutch C-1 by the first linear solenoid valve SL1 to apply engine brake at the first speed. With the C3-B2 apply control valve (switching valve) 26 in the second state (right-half position), the reverse range pressure second input port 26g communicates with the third output port 26f. Because a reverse range pressure is not generated, however, a hydraulic pressure is not supplied to the hydraulic servo C3 for the third clutch.

With the C3-B2 apply control valve 26 in the second state (right-half position), communication between the first port 26j, which communicates with the discharge port 22c of the throttle valve 22, and the drain port 26k is blocked. However, oil at the throttle pressure discharged from the discharge port 22c is discharged via an orifice 30, and led to the output port c of the second solenoid valve S2 at the drain position through communication between the first port 26j and the input port 26l to be discharged from a drain port n. Consequently, the throttle valve 22 outputs a suitable throttle pressure $P_{SLT}$ matching the throttle opening so that the line pressure is suitably controlled by the primary regulator valve 20.

In the case where the SLT full-closure failure detection detector $50_1$ of the control section 50 detects that a throttle pressure is not output from the throttle valve (SLT) 22 which includes a linear solenoid valve to determine a full-closure failure of the throttle valve 22 as discussed above, the first and second solenoid valves S1 and S2 are both controlled so as to be turned on (energized) as illustrated in FIG. 6. Consequently, as illustrated in FIG. 10, the C3-B2 apply control valve 26 which functions as a switching valve is switched to the second state (right-half position), and the solenoid relay valve 27 is switched to the right-half position.

The throttle valve 22 which has been subjected to a full-closure failure is unable to output a throttle pressure with the input port 22a and the output port 22b fully closed (blocked), and with the output port 22b and the discharge port 22c communicating with each other. The second solenoid valve S2 is in the on position in which the input port e and the output port c communicate with each other, and the modulator pressure $P_{mod}$ is output from the output port c. The output pressure (first switching pressure) $P_{S2}$ is supplied to the discharge port 22c of the throttle valve 22 via the input port 26l and the first port 26j of the C3-B2 apply control valve (switching valve) 26. The modulator pressure supplied to the discharge port 22c is supplied to the control oil chamber 20c of the primary regulator valve 20 through the output port 22b in the communicated state.

Consequently, for the primary regulator valve 20, the modulator pressure, that is, the source pressure for the throttle valve 22, is controlled by the maximum pressure B achieved when the throttle valve 22 is at full throttle (fully open), and the line pressure $P_L$ is at the maximum pressure (B). Thus, it is not necessary to set a minimum proof pressure for securing a minimum evacuation drive force when the throttle valve is subjected to a full-closure failure as in the related art (see FIG. 2A), and it is possible to set a line pressure with a lower minimum pressure (A>A') as illustrated in FIG. 2B.

Also in this state, during forward travel, each shift speed excluding the third and seventh speeds can be established by the linear solenoid valves SL1, SL2, SL4, and SL5 excluding the third linear solenoid valve SL3.

In a reverse state in which the shift lever is operated to a reverse speed, the reverse range pressure $P_R$ is supplied to the hydraulic servo B2 for the second brake via the first input port 26c and the first output port 26b of the C3-B2 apply control valve (switching valve) 26 and further the first input port 27b and the output port 27d of the solenoid relay valve 27, and supplied to the hydraulic servo C3 for the third clutch C-3 via the second input port 26g and the third output port 26f of the C3-B2 apply control valve 26. Consequently, a reverse speed is established to enable the vehicle to travel in reverse. During minimum evacuation in which the vehicle travels to a repair garage, the fifth speed is established to travel forward.

Now, a hydraulic control device having a failure circuit according to another partially modified embodiment will be described with reference to FIGS. 11 to 13. Components that are similar to those in FIG. 1 are given the same reference numerals to omit description.

Figure 11:
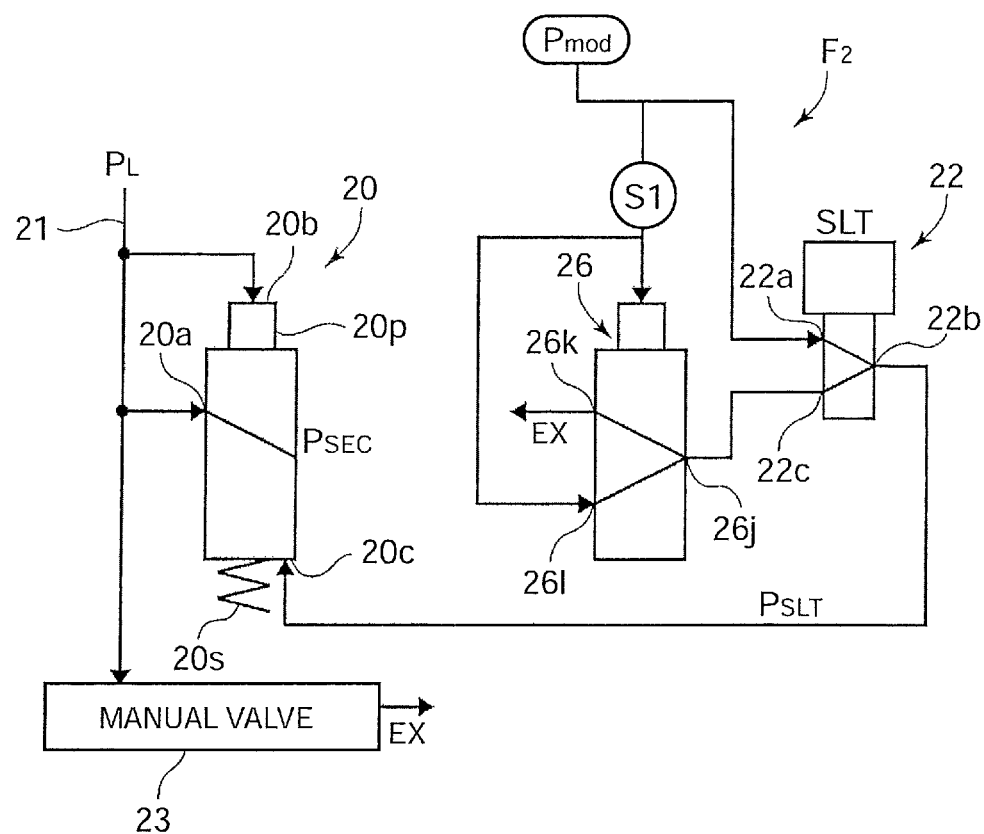
FIG. 11 illustrates a failure circuit according to another embodiment.

In a failure circuit $F_2$ illustrated in FIG. 11, the output pressure $P_{S1}$ of the first solenoid valve S1 is supplied to the input port 26l of the switching valve 26. Thus, the first solenoid valve S1 is in the closed state except when the throttle valve 22 is subjected to a full-closure failure (and during application of engine brake at the first speed), which prevents a predetermined hydraulic pressure (output pressure $P_{S1}$=modulator pressure $P_{mod}$) from being wastefully supplied to the input port 26l of the switching valve 26. Consequently, the flow rate of the hydraulic pressure can be suppressed. For example, if the modulator pressure were directly supplied to the input port 26l, a hydraulic pressure would leak from the drain port 26k which is disposed adjacent to the input port 26l at all times, which might increase the necessary flow rate of the modulator pressure. Since the hydraulic pressure from the first solenoid valve S1 is supplied, however, the effect discussed above can be obtained. Then, when the throttle valve 22 is subjected to a full-closure failure, the first solenoid valve S1 is switched on to switch the switching valve 26 using the output pressure $P_{S1}$, and the output pressure $P_{S1}$ is supplied to the input port 26l, and further supplied to the discharge port 22c of the throttle valve 22 via the first port 26j. Then, the output pressure $P_{S1}$ is supplied from the output port 22b of the throttle valve 22 which is in the fully closed state to the control oil chamber 20c of the primary regulator valve 20.

Figure 12:
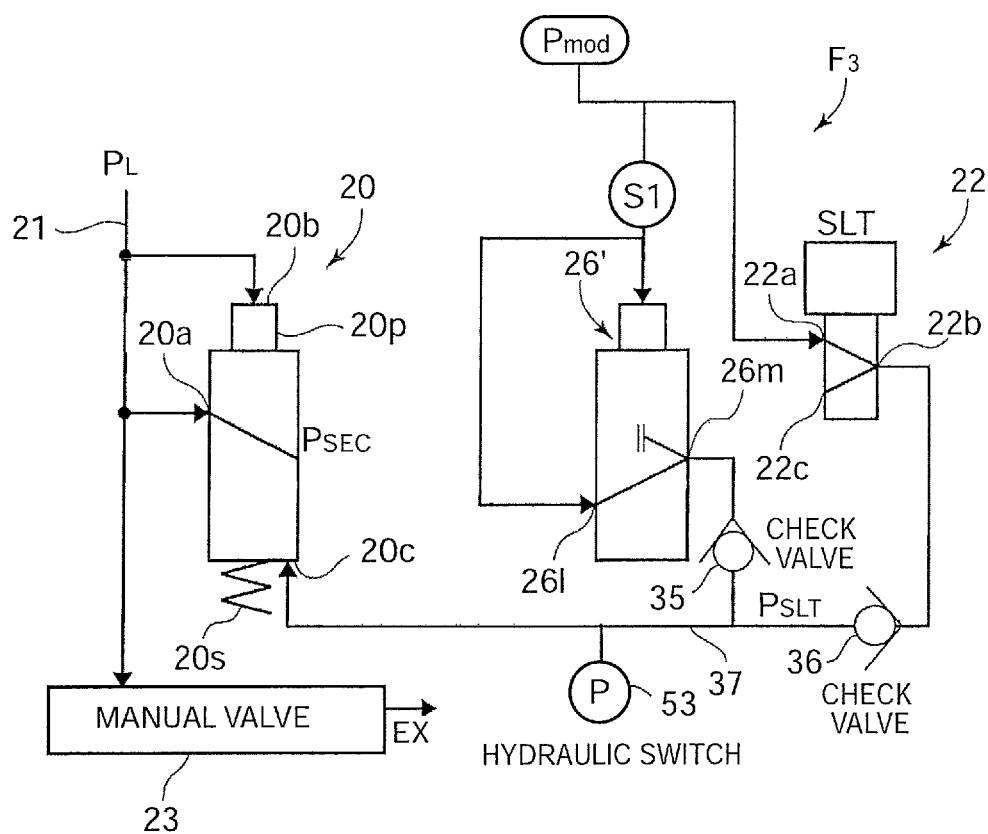
FIG. 12 illustrates a failure circuit according to another embodiment.

In a failure circuit $F_3$ illustrated in FIG. 12, a communication port (first port) 26m of a switching valve 26' communicates with the throttle pressure oil passage 37 via a check valve 35. In the embodiment, the modulator pressure $P_{mod}$ is supplied to the input port 26l. As illustrated in FIG. 11, however, the output pressure $P_{S1}$ of the first solenoid valve S1 may be supplied to the input port 26l. In addition, a check valve 36 is provided upstream of a portion at which the throttle pressure oil passage 37 communicates with the communication port 26m.

In the embodiment, when the throttle valve 22 is normal, the throttle pressure $P_{SLT}$ from the output port 22b is supplied to the control oil chamber 20c of the primary regulator valve 20 via the check valve 36. In this event, the throttle pressure $P_{SLT}$ does not flow to the communication port 26m of the switching valve 26' through the check valve 35. The check valve 35 may not be provided if the switching valve 26' is configured to be blocked in this state. Then, when the throttle valve 22 is subjected to a full-closure failure, the first solenoid valve S1 is switched on, and the input port 26l and the communication port 26m communicate with each other. In this state, the predetermined hydraulic pressure (modulator pressure $P_{mod}$) is supplied to the control oil chamber 20c of the primary regulator valve 20 via the input port 26l, the communication port 26m, the check valve 35, and the oil passage 37. In this event, the predetermined hydraulic pressure in the oil passage 37 is inhibited from flowing to the output port 22b of the throttle valve 22 through the check valve 36, and does not leak from the discharge port 22c.

Figure 13:
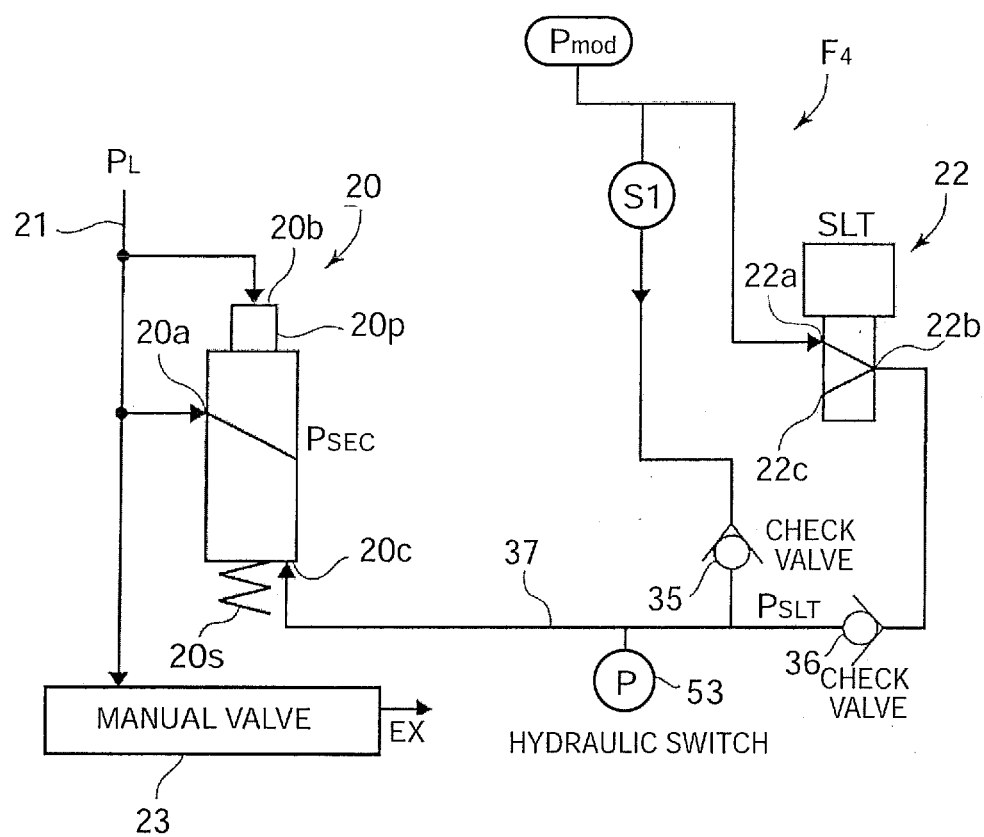
FIG. 13 illustrates a failure circuit according to another embodiment.

In a failure circuit $F_4$ illustrated in FIG. 13, the switching valve is not provided, and the output pressure $P_{S1}$ of the first solenoid valve S1 is directly supplied to the throttle pressure oil passage 37 via the check valve 35. Thus, if the first solenoid valve S1 is switched on when the throttle valve 22 is subjected to a full-closure failure, the output pressure $P_{S1}$ of the solenoid valve S1 is used as the predetermined hydraulic pressure, and supplied to the control oil chamber 20c of the primary regulator valve 20 via the check valve 35 and the oil passage 37. When the throttle valve is normal, the throttle pressure $P_{SLT}$ in the throttle pressure oil passage 37 does not flow in reverse to the first solenoid valve S1 through the check valve 35.

That is, in the present disclosure, a hydraulic pressure is supplied to the control oil chamber of the primary regulator valve via a failure circuit in the case where a full-closure failure of the throttle valve is detected. Particularly preferably, a switching valve is provided, and switched such that a predetermined hydraulic pressure based on the switching is supplied to the control oil chamber of the primary regulator valve.

INDUSTRIAL APPLICABILITY

The present disclosure is utilized for an automatic transmission to be mounted on a vehicle such as an automobile.

The invention claimed is:

1. A hydraulic control device for an automatic transmission, the hydraulic control device comprising:
    a throttle valve that includes an input port to which a source pressure is input, an output port, and a discharge port, and that outputs a throttle pressure regulated in accordance with torque input to the automatic transmission from the output port;
    a primary regulator valve that includes a control oil chamber that communicates with the output port of the throttle valve, a pressure regulation port that communicates with a line pressure oil passage that extends from an oil pump, and a feedback pressure port to which a feedback pressure from the line pressure oil passage is supplied, and that regulates a hydraulic pressure at the pressure regulation port to a line pressure with a hydraulic pressure in the control oil chamber and an urging force of a spring acting on one end of a spool and with the feedback pressure from the feedback pressure port acting on the other end of the spool; and
    a failure circuit that includes a first solenoid valve that is switched when the throttle valve is subjected to a failure in which the throttle valve is unable to output the throttle pressure, and that leads a predetermined hydraulic pressure based on switching of the first solenoid valve to the control oil chamber of the primary regulator valve.

2. The hydraulic control device for an automatic transmission according to claim 1, wherein:
    the failure circuit includes a switching valve that includes a communication port that communicates with the control oil chamber of the primary regulator valve and an input port to which the predetermined hydraulic pressure is supplied, and that is switched by switching the first solenoid valve; and
    when the throttle valve is subjected to a failure in which the throttle valve is unable to output the throttle pressure, the switching valve is switched by switching the first solenoid valve such that the input port and the communication port of the switching valve communicate with each other and the predetermined hydraulic pressure is supplied to the control oil chamber of the primary regulator valve via the input port and the communication port of the switching valve.

3. The hydraulic control device for an automatic transmission according to claim 1, wherein:
    the failure circuit includes a switching valve that includes a first port that communicates with the discharge port of the throttle valve, a drain port, and an input port to which the predetermined hydraulic pressure is supplied, and that is switched by the first solenoid valve; and
    when the throttle valve is subjected to a failure in which the throttle valve is unable to output the throttle pressure, the switching valve is switched by switching the first solenoid valve such that the input port and the first port of the switching valve communicate with each other and the predetermined hydraulic pressure is supplied to the discharge port of the throttle valve via the input port and the first port of the switching valve, and further supplied from the discharge port of the throttle valve to the control oil chamber of the primary regulator valve via the output port.

4. The hydraulic control device for an automatic transmission according to claim 1, wherein
    the predetermined hydraulic pressure is an output pressure of the first solenoid valve.

5. The hydraulic control device for an automatic transmission according to claim 1, wherein
    the throttle valve includes a line pressure regulation linear solenoid valve that uses a modulator pressure as a source pressure, and the predetermined hydraulic pressure is the modulator pressure which is the source pressure for the line pressure regulation linear solenoid valve.

6. The hydraulic control device for an automatic transmission according to claim 1, wherein
the failure circuit includes an oil passage that leads the predetermined hydraulic pressure to the control oil chamber of the primary regulator valve via a check valve.

7. The hydraulic control device for an automatic transmission according to claim 3, further comprising:
a second solenoid valve; and
a supply/discharge switching valve that switches between supply and discharge of a control pressure from a predetermined linear solenoid valve to and from a hydraulic servo for an engine brake friction engagement element that is engaged to apply engine brake at a first forward speed using an output pressure from the second solenoid valve, wherein
the predetermined hydraulic pressure is the output pressure from the second solenoid valve.

8. The hydraulic control device for an automatic transmission according to claim 7, wherein:
the supply/discharge switching valve is switched by the output pressure from the second solenoid valve to a blocked state in which supply of the control pressure to the hydraulic servo for the engine brake friction engagement element is blocked during forward travel at a higher shift speed with a gear ratio that is lower than that of the first forward speed; and
the supply/discharge switching valve is switched to a supply state in which the control pressure can be supplied to the hydraulic servo for the engine brake friction engagement element during travel at the first forward speed or a reverse speed.

9. The hydraulic control device for an automatic transmission according to claim 7, wherein:
the supply/discharge switching valve includes a distribution valve that selectively supplies the control pressure for the predetermined linear solenoid valve to one of a hydraulic servo for a first friction engagement element that is engaged to establish a predetermined forward speed and the hydraulic servo for the engine brake friction engagement element; and
the switching valve is integrally used also as the distribution valve.

10. The hydraulic control device for an automatic transmission according to claim 1, further comprising:
an electronic control unit that detects a failure of the throttle valve in which the input port and the output port are fully closed, wherein
the first solenoid valve is switched to output an output pressure when the electronic control unit detects a failure.

* * * * *